(12) United States Patent
Maslovich

(10) Patent No.: US 7,205,781 B2
(45) Date of Patent: Apr. 17, 2007

(54) MASS AIR FLOW CIRCUIT HAVING PULSE WIDTH MODULATION FEEDBACK CONTROL

(75) Inventor: Randy J. Maslovich, Windsor (CA)

(73) Assignee: Visteon Global Technologies, Inc., Van Buren Township, MI (US)

( * ) Notice: Subject to any disclaimer, the term of this patent is extended or adjusted under 35 U.S.C. 154(b) by 200 days.

(21) Appl. No.: 11/037,764

(22) Filed: Jan. 12, 2005

(65) Prior Publication Data

US 2006/0155488 A1     Jul. 13, 2006

(51) Int. Cl.
G01R 27/08   (2006.01)
G01R 17/10   (2006.01)
G01M 19/00   (2006.01)
G01F 1/68    (2006.01)

(52) U.S. Cl. .................. 324/706; 324/610; 324/725; 73/118.2; 73/204.15; 73/204.25

(58) Field of Classification Search ............... 324/706, 324/725, 610; 73/118.2, 204.15, 204.25
See application file for complete search history.

(56) References Cited

U.S. PATENT DOCUMENTS

| | | | |
|---|---|---|---|
| 4,753,111 A * | 6/1988 | Caron et al. ............. 73/204.14 |
| 4,807,151 A | 2/1989 | Citron |
| 4,934,188 A | 6/1990 | Tanimoto et al. |
| 4,934,189 A | 6/1990 | Tanimoto et al. |
| 4,966,033 A | 10/1990 | Nishimura et al. |
| 5,092,164 A | 3/1992 | Matsuoka et al. |
| 5,156,046 A | 10/1992 | Tanimoto et al. |
| 5,212,983 A | 5/1993 | Ott et al. |
| 5,423,210 A | 6/1995 | Uchiyama |
| 5,533,412 A | 7/1996 | Jerman et al. |
| 5,629,481 A | 5/1997 | Sultan |
| 5,654,507 A | 8/1997 | Hicks et al. |
| 5,679,892 A | 10/1997 | Tomisawa et al. |
| 5,681,989 A | 10/1997 | Kanke et al. |
| 5,753,815 A | 5/1998 | Murata |
| 6,240,775 B1 | 6/2001 | Uramachi et al. |
| 6,327,905 B1 | 12/2001 | Itsuji et al. |
| 6,474,155 B1 | 11/2002 | Berkcan et al. |
| 6,494,090 B1 | 12/2002 | Lösing et al. |
| 6,539,793 B2 * | 4/2003 | Tanimoto et al. ......... 73/204.15 |
| 6,575,027 B1 | 6/2003 | Larsen et al. |
| 6,681,625 B1 | 1/2004 | Berkcan et al. |
| 6,684,693 B2 | 2/2004 | Tanimoto et al. |
| 2002/0170352 A1 | 11/2002 | Tanimoto et al. |
| 2002/0178807 A1 | 12/2002 | Tanimoto et al. |
| 2004/0040377 A1 | 3/2004 | Tanimoto et al. |

* cited by examiner

*Primary Examiner*—Andrew H. Hirshfeld
*Assistant Examiner*—Timothy J Dole
(74) *Attorney, Agent, or Firm*—Brinks Hofer Gilson & Lione

(57) ABSTRACT

A circuit for measuring the mass air flow rate through a duct is disclosed. The circuit includes a bridge circuit, a first amplifier, an oscillator, a comparator and a switch. The bridge circuit has a plurality of resistors arranged to output first and second bridge voltage signals. The first amplifier circuit receives the first and second bridge voltage signals and generates a differential bridge voltage signal. The oscillator provides an oscillating control signal. The comparator is in communication with the first amplifier circuit and the oscillator for comparing the differential bridge voltage signal to the oscillating signal to generate a pulse width modulated differential bridge voltage signal. The switch is in communication with the bridge circuit and the comparator. The switch selectively provides a power voltage signal to the bridge circuit at a frequency corresponding to the pulse width modulated differential bridge voltage signal.

21 Claims, 1 Drawing Sheet

MASS AIR FLOW CIRCUIT HAVING PULSE WIDTH MODULATION FEEDBACK CONTROL

BACKGROUND

Technical Field of the Invention

The present invention generally relates to mass airflow sensors and to electronic control circuits for measuring the mass of air flow through the sensor.

One type of mass airflow sensor utilizes a heating element to directly measure the mass airflow rate through the sensor. This type of sensor is commonly used to measure the flow rate of intake air into an internal combustion engine used in an automobile. Typically, a bridge circuit is utilized to control the power through a hot sense element to keep the hot sensing element at a certain temperature, i.e. 200°, above a cold sensing element. The temperature and resistance of the hot sense element is kept constant when the bridge circuit is in balance. An operational amplifier is used to sense the imbalance in the bridge circuit. The output of the operational amplifier increases or decreases in response to the imbalance of bridge resistors. The output of the operational amplifiers is amplified by the power transistor and fed back to the bridge circuit to keep the hot sense element at the specified temperature, i.e. 200°, above the cold element.

Currently, in prior art circuits, a Darlington power transistor is utilized in its linear region to heat a platinum hot sensing element in a closed loop feedback circuit. However, the efficiency of linear amplifiers is only 18% causing the transistor to dissipate between 850 to 1100 milliwatts of power into the ceramic substrate circuit and throughout the entire sensor heat sink and body. The heat sink temperature raises the sensor substrate an appreciable amount, i.e. 30° C. This increase in temperature causes the sensor body and lead-frame, which are embedded in the sensor housing to also increase in temperature. The sensing elements, especially the cold sensing element, tracks the additional electronic conducted and radiated heat and causes the voltage across the bridge resistor to be in error. The voltage across the bridge resistor is then offset and amplified with error, as is the mass airflow output voltage.

Therefore a need exists for a new and improved mass airflow sensor control circuit. The new and improved mass airflow circuit should have increased efficiency as compared to prior art circuits. Moreover, the new and improved control circuit should create minimal temperature increase in the circuit substrate and heat sink.

SUMMARY

In an aspect of the present invention a circuit for measuring the mass air flow rate through a duct is provided. The circuit includes a bridge circuit, a first amplifier, an oscillator, a comparator and a switch. The bridge circuit has a plurality of resistors arranged to output first and second bridge voltage signals. The first amplifier circuit receives the first and second bridge voltage signals and generates a differential bridge voltage signal. The oscillator provides an oscillating control signal. The comparator is in communication with the first amplifier circuit and the oscillator for comparing the differential bridge voltage signal to the oscillating signal to generate a pulse width modulated differential bridge voltage signal. The switch is in communication with the bridge circuit and the comparator. The switch selectively provides a power voltage signal to the bridge circuit at a frequency corresponding to the pulse width modulated differential bridge voltage signal.

In another aspect of the present invention the bridge circuit has at least four resistors arranged in a Wheatstone bridge configuration.

In yet another aspect of the present invention the oscillator provides a triangular shaped oscillating control signal.

In yet another aspect of the present invention the first amplifier circuit is an operational amplifier.

In still another aspect of the present invention a filter circuit for filtering at least one of the first and second bridge voltage signals is provided.

In still another aspect of the present invention the filter circuit includes a resistor in series with a capacitor.

In still another aspect of the present invention a second amplifier circuit for amplifying one of the first and second bridge voltage signals to generate an amplified output signal is provided.

In still another aspect of the present invention a gain circuit for setting the gain provided by the second amplifier circuit is provided.

In still another aspect of the present invention a voltage to frequency converter in communication with the second amplifier for converting at least one of the first and second bridge voltage signals from an analog signal to a frequency is provided.

In still another aspect of the present invention a three-way switch for selectively switching between one of a bridge voltage signals, a frequency signal and a programming signal is provided.

DESCRIPTION

Figure 1:
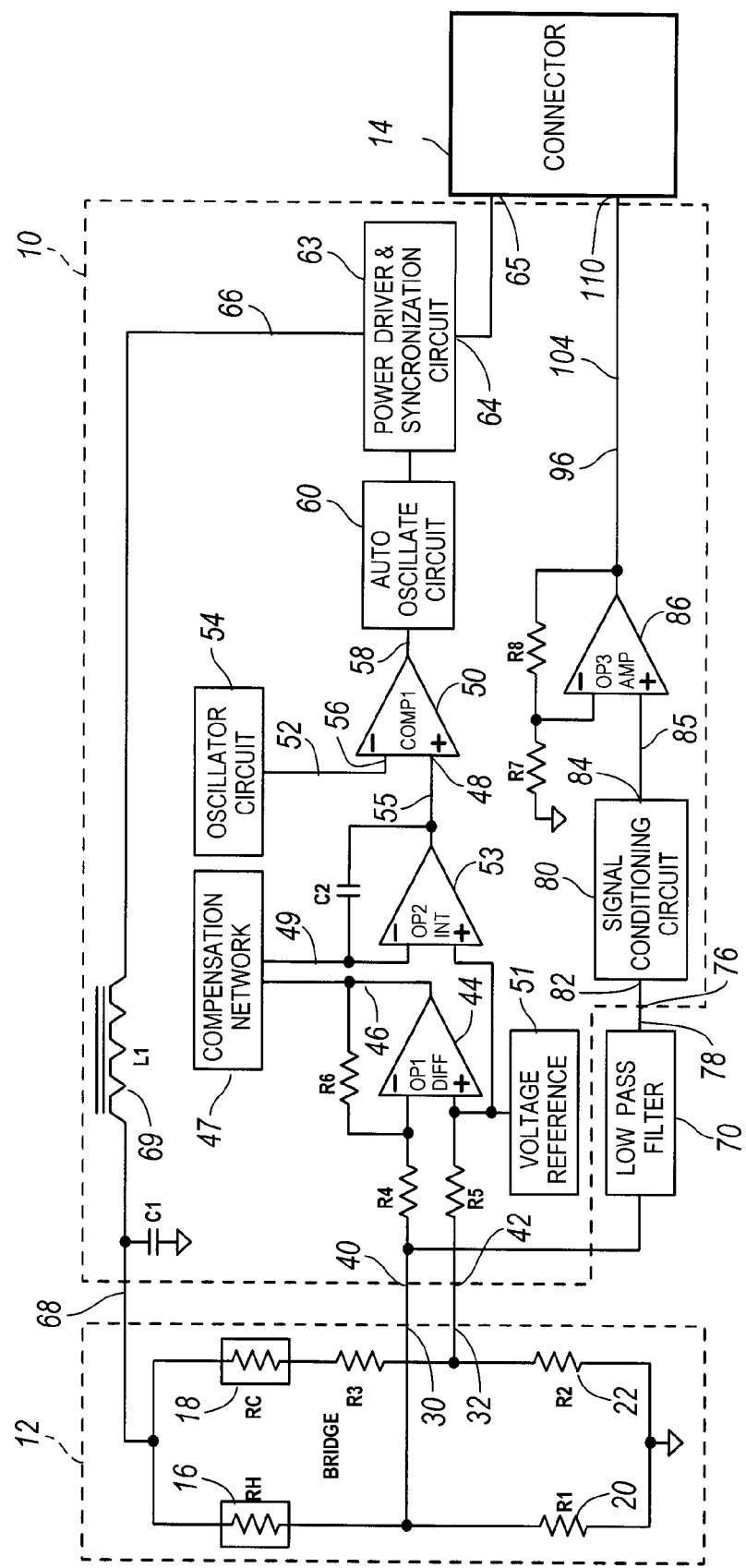
FIG. 1 is a schematic diagram of a control circuit for determining the mass airflow rate through a mass airflow sensor, in accordance with an embodiment of the present invention.

Referring now to FIG. 1, a mass airflow sensor control circuit 10 is illustrated, in accordance with an embodiment of the present invention. Mass airflow sensor control circuit 10 is in communication with a bridge circuit 12 that detects the mass airflow rate through, for example, a vehicle induction system of an internal combustion engine. Generally, the mass airflow rate is detected by monitoring the imbalance in the bridge circuit caused by the cooling effect on the resistive elements of the bridge circuit, as will described in further detail below. The control circuit 10 is also connected to a connector 14 that supplies power to the control circuit through a battery output port 65. An output pin 110 of the connector 14 receives the control circuit output signal indicative of the mass airflow rate measurement.

The bridge circuit 12 is configured in a classic Wheatstone bridge arrangement. Four resistors make up bridge circuit 12. The top portion of the bridge includes a hot bridge resistor (RH) 16 in parallel electrical connection with a cold bridge resistor (RC) 18. The bottom portion of the bridge circuit 12 includes a resistor (R1) 20 in parallel electrical connection with a resistor (R2) 22. Outputs 30 and 32 of bridge circuit 12 are provided for sensing the imbalance in the bridge circuit 12.

With continuing reference to FIG. 1, control circuit 10 will now be described in more detail, in accordance with an embodiment of the present invention. Outputs 30 and 32 of bridge circuit 12 are received at inputs 40 and 42 of control circuit 10. Inputs 40 and 42 of control circuit 10 are fed into an operational amplifier 44 that outputs an error signal 46. The error signal 46, which represents the differential bridge voltage, is fed into a compensation network 47 which changes the phase of error signal 46 and outputs a compensated signal 49.

The compensated signal 49 and a voltage reference 51 are fed into a second operational amplifier 53 which will invert the compensated signal 49 and outputs an inverted signal 55. The voltage reference 51 may be 1.22 volts. The inverted signal 55 is fed into a first input port 48 of a comparator 50. The comparator 50 compares the inverted signal 55 to a triangular shaped oscillating signal 52 generated by a pulse width modulator oscillator 54 at an input port 56 of the comparator 50. Of course, the present invention contemplates the use of oscillating control signals of other shapes, such as, square, etc. The comparator 50 outputs a pulse width modulated signal 58.

The pulse width modulated signal 58 is received by an auto oscillate circuit 60. The auto oscillate circuit 60 determines if the pulse width modulated signal 58 is present. If there is no pulse width modulated signal 58 present, auto oscillate circuit 60 will output a default pulse width modulated signal. If there is the pulse width modulated signal 58 present, auto oscillate circuit 60 will output the pulse width modulated signal 58.

The output of the auto oscillate circuit is then fed into a power driver and synchronization circuit 63. The power driver and synchronization circuit 63 receives power from a battery input port 64. The battery input port 64 is connected to the battery output port 65. As explained previously, the connector 14 supplies power to the control circuit through the battery output port 65. The power driver and synchronization circuit 63 provides power to the bridge circuit 12, amplifies the output of the auto oscillate circuit 60 and outputs an amplified pulse width modulated power signal 66. The power driver and synchronization circuit 63 includes a switch (not shown). The switch, which may be an n-channel MOSFET, switches battery power received from the battery input 65 of connector 14 at the input port 64 to create the modulated power signal 66. The pulse width modulated power signal 66 is sent through an inductor 69 and then outputted to bridge circuit 12 through an output port 68 of control circuit 10.

The output signal 32 is received by the input port 40 and passed through a low pass filter 70. The output of the low pass filter 70 is received at input port 76 of control circuit 10. Low pass filter 70 may be a resistor in series with a capacitor. A filtered voltage signal 78 is outputted by the low pass filter 70 and received at an input port 82 of signal conditioning circuit 80.

Signal conditioning circuit 80 converts the filtered voltage signal 78 into a 16 bit digital signal through the use of an analog to digital converter. The 16 bit digital signal is then adjusted to take into account appropriate gain and offset as well as temperature drift. For example, an electronic memory component (i.e. an EEProm) (not shown) connected to signal conditioning circuit 80 may be used to store circuit information, such as resistor offsets, gain, internal charge pump frequency output, voltage reference temperature compensation, output toggle frequency or voltage, current for operational amplifier input offset, etc.

The adjusted 16 bit signal is then converted into a conditioned analog signal 85 through the use of a digital to analog converter and outputted through an output port 84 of the signal conditioning circuit 80. Alternatively, the conditioned analog signal 85 may be fed into a voltage to frequency converter before being outputted through the output port 84 of the signal conditioning circuit 80. A three-way switch (not shown) may be used to switch between the conditioned analog signal 85, the conditioned analog signal 85 after being fed through a voltage to frequency converter or a programming signal.

Operational amplifier 86 amplifies the conditioned analog signal 85 and an amplified output signal 96 is produced. An output line 104 is connected to the amplified output signal 96. Analog output line 104 provides an analog output to the connector pin 110 of the connector 14.

In operation, the control circuit 10 pulse width modulates the switch (not shown) to increase the efficiency of the transistor from 18 to 85%. This increase in efficiency helps keep the temperature increase of the circuit very low to approximately 5° C. above ambient as compared to 30°. Thus, error caused by the added heat of the electronics is negligible. An imbalance in the bridge circuit 12 is received by operational amplifier 44 the input port 40. The output of the comparator 50 is the pulse width modulated signal 58 whose duty cycle is increased or decreased in response to the output from the bridge circuit. The pulse width modulated signal 58 is amplified by the power driver and synchronization circuit 63 and fed back to the top of the bridge circuit to control RH 16. The voltage across resistor (R1) 20 is passed through a low pass filter to remove the pulse width modulation, off-set and amplified to produce an analogue voltage that can be sent to a powertrain control module (not shown) as the mass flow voltage or input into a voltage to frequency converter for mass air flow frequency and output to a power control input (not shown).

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A circuit for measuring the mass air flow rate through a duct, the circuit comprising:
    a bridge circuit having a plurality of resistors arranged to output first and second bridge voltage signals;
    a first amplifier circuit for receiving the first and second bridge voltage signals and generating a differential bridge voltage signal;
    a compensation network for receiving the differential bridge voltage signal, changing the phase of the differential bridge voltage signal, and generating a compensated signal;
    an oscillator for providing an oscillating control signal;
    a comparator in communication with the first amplifier circuit, the compensation network, and the oscillator for comparing the compensated signal to the oscillating signal to generate a pulse width modulated differential bridge voltage signal; and
    a switch in communication with the bridge circuit and the comparator, wherein the switch selectively provides a power voltage signal to the bridge circuit at a frequency corresponding to the pulse width modulated differential bridge voltage signal.

2. The circuit of claim 1 wherein the bridge circuit has at least four resistors arranged in a Wheatstone bridge configuration.

3. The circuit of claim 1 wherein the oscillator provides a triangular shaped oscillating control signal.

4. The circuit of claim 1 wherein the first amplifier circuit is an operational amplifier.

5. The circuit of claim 1 further comprising a filter circuit for filtering at least one of the first and second bridge voltage signals.

6. The circuit of claim 5 wherein the filter circuit includes a resistor in series with a capacitor.

7. The circuit of claim 1 further comprising a second amplifier circuit for amplifying one of the first and second bridge voltage signals to generate an amplified output signal.

8. The circuit of claim 7 further comprising a gain circuit for setting the gain provided by the second amplifier circuit.

9. The circuit of claim 7 further comprising a voltage to frequency converter in communication with the second amplifier for converting at least one of the first and second bridge voltage signals from an analog signal to a frequency.

10. The circuit of claim 1 further comprising an auto oscillate circuit in communication with the comparator and the switch, the auto oscillate circuit operable to determine whether the pulse width modulated differential bridge voltage signal is present, the auto oscillate circuit further operable to generate a default pulse width modulated signal if the auto oscillate circuit determines that no pulse width modulated differential bridge voltage signal is present.

11. A circuit for measuring the mass air flow rate through a duct, the circuit comprising:
   a bridge circuit having a plurality of resistors arranged to output first and second bridge voltage signals;
   a first amplifier circuit for receiving the first and second bridge voltage signals and generating a differential bridge voltage signal;
   an oscillator for providing an oscillating control signal;
   a comparator in communication with the first amplifier circuit and the oscillator for comparing the differential bridge voltage signal to the oscillating signal to generate a pulse width modulated differential bridge voltage signal;
   a switch in communication with the bridge circuit and the comparator, wherein the switch selectively provides a power voltage signal to the bridge circuit at a freguency corresponding to the pulse width modulated differential bridge voltage signal; and
   a three-way switch for selectively switching between one of a bridge voltage signals, a frequency signal and a programming signal.

12. A circuit for measuring the mass air flow rate through a duct, the circuit comprising:
   a bridge circuit having a plurality of resistors arranged to output first and second bridge voltage signals;
   a first amplifier circuit for receiving the first and second bridge voltage signals and generating a differential bridge voltage signal;
   a compensation network for receiving the differential bridge voltage signal, changing the phase of the differential bridge voltage signal, and generating a compensated signal;
   an oscillator for providing an oscillating control signal;
   a comparator in communication with the first amplifier circuit, the compensation network, and the oscillator for comparing the compensated signal to the oscillating signal to generate a pulse width modulated differential bridge voltage signal; and
   a switching means in communication with the bridge circuit and the comparator, wherein the switching means selectively provides a power voltage signal to the bridge circuit at a frequency corresponding to the pulse width modulated differential bridge voltage signal.

13. The circuit of claim 12 wherein the oscillator provides a triangular shaped oscillating control signal.

14. The circuit of claim 12 wherein the first amplifier circuit is an operational amplifier.

15. The circuit of claim 12 further comprising a filter circuit for filtering at least one of the first and second bridge voltage signals.

16. The circuit of claim 15 wherein the filter circuit includes a resistor in series with a capacitor.

17. The circuit of claim 12 further comprising a second amplifier circuit for amplifying one of the first and second bridge voltage signals to generate an amplified output signal.

18. The circuit of claim 17 further comprising a gain circuit for setting the gain provided by the second amplifier circuit.

19. The circuit of claim 18 further comprising a voltage to frequency converter in communication with the second amplifier for converting at least one of the first and second bridge voltage signals from an analog signal to a frequency.

20. The circuit of claim 12 further comprising an auto oscillate circuit in communication with the comparator and the switching means, the auto oscillate circuit operable to determine whether the pulse width modulated differential bridge voltage signal is present, the auto oscillate circuit further operable to generate a default pulse width modulated signal if the auto oscillate circuit determines that no pulse width modulated differential bridge voltage signal is present.

21. A circuit for measuring the mass air flow rate through a duct, the circuit comprising:
   a bridge circuit having a plurality of resistors arranged to output first and second bridge voltage signals;
   a first amplifier circuit for receiving the first and second bridge voltage signals and generating a differential bridge voltage signal;
   an oscillator for providing an oscillating control signal;
   a comparator in communication with the first amplifier circuit and the oscillator for comparing the differential bridge voltage signal to the oscillating signal to generate a pulse width modulated differential bridge voltage signal;
   a switching means in communication with the bridge circuit and the comparator, wherein the switching means selectively provides a power voltage signal to the bridge circuit at a frequency corresponding to the pulse width modulated differential bridge voltage signal; and
   a three-way switch for selectively switching between one of a bridge voltage signals, a frequency signal and a programming signal.

* * * * *